United States Patent [19]
Soda et al.

[11] Patent Number: 5,587,203
[45] Date of Patent: Dec. 24, 1996

[54] METHOD FOR PREPARING A CARBON/CARBON COMPOSITE MATERIAL

[75] Inventors: Yoshio Soda; Takefumi Kohno; Masaaki Shinagawa; Noriyuki Kiuchi, all of Yokohama, Japan

[73] Assignee: Nippon Oil Co., Tokyo, Japan

[21] Appl. No.: 520,654

[22] Filed: Aug. 29, 1995

Related U.S. Application Data

[63] Continuation-in-part of Ser. No. 342,858, Nov. 21, 1994, abandoned.

[30]    Foreign Application Priority Data

Nov. 29, 1993  [JP]  Japan ..................... 5-320817

[51] Int. Cl.$^6$ ........................................ B05D 3/02
[52] U.S. Cl. ................ 427/228; 427/369; 427/371; 427/379; 427/385.5
[58] Field of Search ...................... 427/228, 379, 427/369, 371, 385.5

[56]          References Cited

U.S. PATENT DOCUMENTS

| 4,226,900 | 10/1980 | Carlson et al. | 427/228 |
| 5,022,343 | 6/1991 | Fujikawa et al. | 428/47 |
| 5,137,755 | 8/1992 | Fujikawa et al. | 427/228 |
| 5,181,979 | 1/1993 | Uemura et al. | 427/228 |

FOREIGN PATENT DOCUMENTS 3921980  1/1990  Germany.

OTHER PUBLICATIONS

Carbon, vol. 11, pp. 570–574, 1973 E. Fitzer et al, "The pryolysis . . . "(no mo.).

*Primary Examiner*—Janyce Bell
*Attorney, Agent, or Firm*—Bucknam And Archer

[57]          ABSTRACT

A method for preparing a carbon/carbon composite material which is characterized in that a carbon preform is impregnated with a carbonaceous pitch exhibiting a densification parameter of 0.1 or more, said densification parameter being represented by the following formula (1), and then subjected to an isotactic compression at a pressure higher than the atmospheric pressure but not higher than 10 Kgf/cm$^2$ and at a sintering temperature of 250° to 3,000° C., thereby densifying the carbon preform:

Densification parameter={(Weight of a sintered carbonaceous pitch (hereinafter, referred to simply as a sintered product) to be obtained through a process where a carbonaceous pitch in an open-type container is heated from room temperature up to 1000° C. at a rate of 2° C./min., and then sintered for 2 hours at 1000° C. under isotactic compression of 9.5 Kgf/cm$^2$)}/(Weight of a carbonaceous pitch before being sintered)×{(Bulk density of the sintered product in the open-type container)/(True density of the sintered product)}. . . (1).

8 Claims, No Drawings

METHOD FOR PREPARING A CARBON/CARBON COMPOSITE MATERIAL

This case is an continuation-in-part of U.S. Ser. No. 08/342,858, filed Nov. 21, 1994, now abandoned.

BACKGROUND OF THE INVENTION

1. Field of the Invention

This invention relates to a method for preparing a carbon/carbon composite material.

2. Prior Art

Carbon fiber reinforced carbon matrix composite materials are light in weight, have thermal resistance and, further, they are superior in sliding movability, strength, breaking toughness and thermal conductivity etc., so that they are used as industrial materials such as heat resistant materials, brake materials and furnace materials.

In the preparation of the carbon fiber reinforced/carbon composite materials, first carbon fibers are molded or carbon fibers together with pitch or a thermoset resin as a binder are molded, they are then carbonized to make preforms and the preforms so made are subsequently densified.

Although there has been proposed a method for completing said preform and densification in one step, the obtained carbon fiber reinforced carbon matrix composite materials will be insufficient in strength and sliding movability and will be unable to be used as heat resistant structural materials for space applications or brake materials even if they may be used as furnace materials and the like. Therefore, carbon fiber reinforced carbon matrix composite materials adapted for applications requiring sufficient strength and sliding movability are generally prepared by first making preforms thereof and then densifying the preforms.

A CVD (chemical vapor deposition) method has hitherto been most widely used as a process of densifying such preforms, but this method takes a long period of time and incurs high costs. On the other hand, there is a method for impregnating preforms with a thermosetting resin such as a phenolic resin or a furan resin and carbonizing the resin so impregnated, but this method also takes a long period of time for carbonization of the resin and is not preferable in view of the cost because of its low yield, and the method has a disadvantage that the obtained composite material is low in thermal conductivity.

Furthermore, there is a method which comprises using pitch for densification, but this method generally has disadvantages because pitch is carbonized via its liquid phase so as to be bubbled during carbonization by gases produced by thermal cracking, etc. at normal pressure with the result that the obtained carbonized material is markedly low in bulk density. Additionally, the yield of carbonized material obtained at this time is also low. In order to prevent bubbling during carbonization and a decrease in yield of carbonized material, there has been proposed a method for carbonization under pressure. For example, there has been reported in ICCM (International Conference on Composite Materials)-2, PP. 1302–1319 (1978) a method to carbonize pitch in a HIP device under a pressure of 6.9–68.9 MPa (70–703 kgf/cm$^2$), whereby the yield obtained is improved.

It has also been reported in "Carbon. Vol. 11, PP. 570–574 (1973)" that yields of carbonized materials obtained by carbonizing pitch under pressure up to 100 bars (102 kgf/cm$^2$) were examined whereby the pressuring effect was found to be achieved at a pressure of 25 bars (25.5 kgf/cm) or above.

Further, "Carbon, No. 125, p.62 (1986)" describes that it is possible to make constant the yield of carbonization under a pressure of 1 MPa. However, this publication does not consider a method of manufacturing a carbon/carbon composite material excellent in densification efficiency by carbonizing a preform impregnated with pitch under a pressure off 10 Kgf/cm$^2$ or less.

There are known two different kinds of compression method as a pressure-sintering method of carbon preform, i.e., a uniaxial compression method and an isotactic compression method.

According to the uniaxial compression method, a carbon preform impregnated in advance with a carbonaceous pitch is introduced into a die, and then sintered in the die while being unidirectionally compressed with a rod. On the other hand, according to the isotactic compression method, a carbon preform impregnated in advance with a carbonaceous pitch is disposed in a pressure chamber, and then heated in the pressure chamber after the pressure chamber is filled and sufficiently pressurized with a pressurizing medium, preferably an inert gas, or while the pressure chamber is filled and increasingly pressurized with a pressurizing medium, thereby isotactically sintering the carbon preform.

There is a problem that due to the vaporization of low boiling point components within the carbon preform or due to the generation of thermally decomposed gases from the carbon preform during the pressure-sintering, the carbon preform becomes porous, thus lowering the bulk density of the sintered body.

According to the uniaxial compression method, in view of increasing the bulk density of the carbon preform, the gases inside the carbon preform are allowed to be pushed out through a space between the die and rod by compressing the carbon preform with a rod from one direction of the carbon preform. On the other hand, according to the isotactic compression method, the cell within the preform is not removed from the preform, but is minimized in size and confined within the preform by increasing the pressure of the pressurizing medium.

The isotactic compression method is advantageous in that the bulk density of the carbon preform can be easily increased by repeating the densification treatment, since the cell is simply minimized according to this method in contrast to the uniaxial compression method.

However, these proposed methods require special devices such as a HIP (Hot Isostatic Pressure) device, an autoclave or a metallic bomb and are low in productivity. In addition, these devices for applying high pressures have been a cause for various limitations on the manufacture of large-sized products.

SUMMARY OF THE INVENTION

An object of this invention is to provide a method for preparing a carbon/carbon composite material efficiently without using any ultra-high isotropic pressure device.

In the following description, the term of "compression" means an isotactic compression unless specified otherwise. Further, the values of compression strength indicated hereinafter are all based on the gauge pressure (a pressure to be obtained by subtracting the atmospheric pressure from the absolute pressure).

The above-mentioned object of this invention is attained by a preparation method described below.

The present invention relates to a method of preparing a carbon/carbon composite material which is characterized in that a carbon preform is impregnated with a carbonaceous pitch exhibiting a densification parameter of 0.1 or more, said densification parameter being represented by the following formula (1), and then subjected to an isotactic compression at a pressure higher than the atmospheric pressure but not higher than 10 Kgf/cm² and at a sintering temperature of 250° to 8,000° C., thereby densifying the carbon preform:

Densification parameter={(Weight of a sintered carbonaceous pitch (hereinafter, referred to simply as a sintered product) to be obtained through a process where a carbonaceous pitch in an open-type container is heated from room temperature up to 1000° C. at a rate of 2° C./min., and then sintered for 2 hours at 1000° C. under isotactic compression of 9.5 Kgf/cm²)}/(Weight of a carbonaceous pitch before being sintered)×{(Bulk density of the sintered product in the open-type container)/(True density of the sintered product)}. . . (1).

The method of preparing a carbon/carbon composite material according to this invention is explained in more detail as follows.

The carbon preforms defined in this invention are referred to as those obtained by molding carbon fibers and/or raw materials for carbon fibers or by molding these fibers and carbon matrix precursor.

The carbon fibers defined herein are obtained by carbonization or graphitization of precursor fibers derived from pitch, polyacrylonitrile or rayon. The carbonization treatment is carried out at 1000°–1500° C.; and the graphitization treatment, at 2000°–3000° C. The raw materials for carbon fibers are precursors of the above-mentioned carbon fibers. For example, the precursor fibers of pitch-derived carbon fibers obtained by spinning pitch having a softening point of 200°–400° C., obtained by making the pitch-spun fibers infusible, or obtained by pre-carbonization treatment. Although treating temperatures of the precursor fibers vary other with individual processes, the infusibilizing or stabilizing treatment is carried out at 200°–450° C.; the pre-carbonization treatment, at 400°–1000° C.

The molded products of carbon fibers and/or raw materials for carbon fibers are referred to as two-dimensional or three-dimensional moldings made from fiber aggregates such as three-dimensional textiles, felts and mats.

Furthermore, the products obtained by compositely molding carbon fibers and/or raw materials for carbon fibers together with raw materials for carbon matrix, are referred to as those obtained by molding a bundle composed of 500–25,000 fibers, one-directional laminates, multi-directional laminates, two-dimentional textiles or their laminates with use of carbonizable binders (which is one of the carbon matrix materials) and thereafter carbonizing them.

Herein, as the carbon matrix precursor, there may be mentioned those having thermoplastic property such as pitch having a softening point of 100°–400° C. (binder pitch) as well as those having thermosetting property such as a phenolic resin and a furan resin.

It is desirable that the carbon preforms used in this invention have a void volume fraction of generally 5–80%, preferably 10–75%, and more preferably 20–75%.

According to this invention, the above-mentioned carbon preforms are impregnated with carbonaceous pitch and then treated with heat, preferably carbonized or carbonized and graphitized under an inert gas atmosphere at 250°–3000° C., preferably at 500°–2800° C. to densify the preforms. On this occasion, it is necessary that the above-mentioned densification parameter be not less than 0.1 and that a pressure above atmospheric pressure and less than 10 kgf/cm² be applied.

A most convenient way for improving the densification efficiency is to select, through screening, a carbonaceous pitch having a higher densification parameter.

The term of "sintering conditions"0 referred to in this specification should be understood as indicating at least one, or a plurality of conditions selected from the sintering temperature, the pressure, the rate of temperature increase, the maximum temperature-retention time and the pressurizing atmosphere.

The selective use of a carbonaceous pitch having a higher densification parameter is effective in decreasing the number of repetition of densification treatment required for obtaining an aimed density of product in a densification treatment which will be carried out at a low-pressure ranging from more than the atmospheric pressure to less than 100 Kgf/cm², more preferably ranging from more than the atmospheric pressure to 10 Kgf/cm².

In particular, it is necessary to select such pitch that the densification parameter after carrying out sintering a carbonaceous pitch only under pressure in an open-type container, preferably carbonization under pressure at 9.5 kgf/cm² exhibits a value between 0.10 and 1.0, preferably a value between 0.15 and 1.0. If the densification parameter is less than the above mentioned range, the densifying effect will decrease and take a long period of time to achieve, the impregnation and carbonization will increase in number of cycles, or a high pressure is necessary at the time of carbonization, any of which are not preferable.

According to the densification by the isotactic compression method, it is impossible to easily push gases out of the preform in contrast to the uniaxial compression method.

Therefore, it is required to employ a pitch which is capable of exhibiting a high bulk density after sintering; for example, a pitch which is not only high in carbonization yield, but also low in the generation of decomposed gases, or a pitch such as a low viscosity/low softening point pitch, which can be easily impregnated into a carbon preform and at the same time easily degassed even if gases are generated therefrom.

Namely, it can be said that a carbonaceous pitch having a higher densification parameter is a pitch which is high not only in carbonization yield but also in bulk density after sintering.

When the pressure in the sintering step is 10 Kgf/cm² or more, the bulk density can be increased by about 0.01 to 0.2 g/cm³. However other features such as Shore hardness or thermal diffusivity after the densification of carbon/carbon composite can not be improved even if the pressure is increased to such a high degree, so that if there is no need to increase the bulk density of carbon/carbon composite so much, the employment of excessively high pressure in the densification step would be the waste of manufacturing cost.

Therefore, the object of this invention is to find out an optimum condition which makes it possible to manufacture, in low cost, a carbon/carbon composite which is excellent in physical properties such as Shore hardness or thermal diffusivity under a pressure which is higher than the atmospheric pressure but not higher than 10 Kgf/cm².

The screening of carbonaceous pitch is performed under a specific sintering condition for obtaining a carbonaceous pitch having a large densification parameter. This is because it is possible, with the employment of this carbonaceous pitch having a large densification parameter, to effectively densify a carbon preform by sintering it under a pressure higher than the atmospheric pressure but not higher than 10 Kgf/cm² and at a temperature ranging from 250° C. to 3,000° C. even if the rate of temperature increase or the maximum temperature-retention time is varied.

Although it is possible to carry out an effective densification under a pressure higher than the atmospheric pressure but lower than 10 Kgf/cm² by employing a carbonaceous pitch having a densification parameter meeting the conditions mentioned above, it is desirable to select a carbonaceous pitch excellent in densification efficiency by measuring the densification parameter under a pressure condition which is as close as possible to the actual pressure condition in the densification treatment, e.g., preferably 2 to less than 10 Kgf/cm², more preferably 7 to less than 10 Kgf/cm².

If the sintering is carried out at a temperature of 550° C. or more, more preferably 800° C. to 1100° C., most of the decomposition products to be generated during the sintering would be hydrogen gas, so that the weight variation during the sintering at a temperature higher than that mentioned above would be minimum, thus hardly giving any influence to the densification parameter. Accordingly, it is possible to stop the heating of the pitch and to carry out the measurement of the densification parameter immediately after the temperature reaches the sintering temperature mentioned above during the screening in an open-type container.

Meanwhile, when the rate of temperature increase during the densification treatment is much less than 300° C./hr., the densification parameter tends to become larger (namely, densification efficiency is increased). However, if the rate of temperature increase is in the range of 300° C. to 50,000° C./hr., the densification parameter may be kept constant substantially irrespective of the rate of temperature increase.

However, it is undesirable to set the rate of temperature increase for the densification to less than 0.05° C./hr. in view of manufacturing cost.

The measurement of the densification parameter is carried out in an inert gas atmosphere, preferably in nitrogen gas atmosphere.

Carbonaceous pitch is coal- or petroleum-derived pitch having a softening point of 40°–400° C., preferaby 50°–250° C., more preferaby 50°–99° C., among which one satisfying said densification parameter is used herein. Carbonaceous pitch, whether optically isotropic or anisotropics may be used herein as long as it satisfies said densification parameter. An upper limit of the carbon/hydrogen atomic ratio of carbonaceous pitch is generally less than 1.60, preferably less than 1.50. A lower limit of the carbon/hydrogen atomic ratio of carbonaceous pitch is generally more than 0.8, preferably more than 1.0, more preferably more than 1.1, most preferably more than 1.15. If the carbon/hydrogen atomic ratio of carbonaceous pitch is more than the above-mentioned range, the carbonaceous pitch is not advantageous since it may not satisfy the required densification parameter of 0.10 or more, or may be difficult of impregnation to a carbon preform due to high viscosity of pitch used.

It is possible to melt the usable carbonaceous pitch under a reduced pressure or to increase its fluidity by means of a solvent, in order to impregnate the preforms with the carbonaceous pitch.

The sintering conditions described in the following description, namely the sintering temperature, the rate of temperature increase, the maximum temperature-retention time, the pressure and the pressurizing atmosphere during the sintering process are for use in the actual densification treatment after a carbon preform is impregnated with a carbonaceous pitch.

An upper limit of the temperature during the treatment with heat, prefereably during the carbonization under pressure is generally not more than 2800° C., preferably not more than 2500° C., more preferably not more than 2000° C., much more preferably not more than 1500° C., and most preferably not more than 1100° C. A lower limit of a temperature during the carbonization under pressure is generally not less than 250° C., preferably not less than 350° C., more preferably not less than 500° C., more preferably not less than 610° C., much more preferably not less than 660° C., and most preferably not less than 710° C. An upper limit of the temperature during the graphitization under pressure is generally not more than 3000° C., preferably not more than 2800° C. and more preferably not more than 2500° C. A lower limit of the temperature during the graphitization under pressure is generally not less than 1500° C., preferably not less than 2000° C. and more preferably not less than 2200° C. When the sintering temperature is higher than the lower limit, the gases generating from the preform are mainly composed of hydrogen gas decomposed in the preform, so that the bulk density of the preform would be hardly decreased. However, since the hydrogen gas thus decomposed may become a cause of crack, it is advisable, in order to prevent such a crack, to sinter the preform while maintaining a sufficient pressure until the hydrogen gas is no more generated. If the temperature used is less than the above-mentioned range, sufficient effects of treatment with heat, preferably carbonization and graphitization under pressure may not undesirably be obtained. Furthermore, the heating rate used herein is generally 0.05° C./hour–12000° C./hour, preferably 0.5° C./hour–5000° C./hour, more preferably 1° C./hour–1000° C./hour, preferably 2° C./hour–500° C./hour, more preferably 10° C./hour–300° C./hour.

The process of raising the temperature may be performed by including in the middle of the process a temporary temperature drop, or may be performed stepwise, thus raising the temperature little by little.

The maximum temperature-retention time in the step of densification treatment may be any period of time as long as it is long enough to sufficiently promote the carbonization or graphitization at a given sintering temperature, e.g., the higher the sintering temperature is, the shorter the retention time.

The lower limit of the maximum temperature-retention time is generally 0.01 minute, preferably one hour or more, and the upper limit thereof is generally ten hours or less, preferably five hours or less, more preferably three hours or less.

The pressure used during the densification, preferably the treatment with heat, more preferably the carbonization or carbonization and graphitization under pressure is more than atmospheric pressure to not more than 10 kgf/cm², preferably more than 2 kgf/cm² to less than 10 kgf/cm² and more preferably more than 7 kgf/cm² to less than 10 kgf/cm². In the case of using a pressure less than the above-mentioned range, the carbonization yield and densification parameter will be markedly lowered. Furthermore, in the case of using a pressure more than the above-mentioned range, there will not be recognized any large increase in carbonization yield and, a device resistant to such a high pressure and to be obliged to use an expensive inert gas such as argon gas will be quite expensive. Although there is a method to fill gas in a furnace at any pressure less than a specified presssure and then increase the pressure of the filled gas to the specified pressure with use of volume expansion of the gas occurring with the temperature raise in the furnace, the low molecular components in pitch may start to vaporize or decompose before the specified pressure being attained and, therefore, it is preferable to set a intra-furnace pressure at the specified pressure at the beginning of carbonization under pressure.

Alternatively, the carbonization may be performed under the normal pressure until the temperature is raised up high enough to cause the generation of decomposed gases from a carbonaceous pitch, for example a temperature of 250° to 3,000° C., preferably 350° to less than 1,100° C., thereby allowing low boiling point components to be removed from the pitch, and after the generation of the decomposed gases, under the predetermined high pressure as mentioned above.

A gas used for applying a pressure is not particularly limited as long as it is non-oxidizing, and it may generally be nitrogen gas, argon gas or helium gas. However, since the sintering is performed under a relatively low pressure, i.e., 10 Kgf/cm$^2$ or less according to this invention, nitrogen gas can be preferably employed in view of easiness in availability and of its low cost.

The carbon/carbon composite materials can thus be prepared by densifying the carbon preforms as described above, and furthermore it is possible to further enhance the composite materials in density by densifying again or improve the composite materials in properties by carrying out carbonization or carbonization and graphitization under normal pressure if necessary.

Specific method of measuring the densification parameter will be explained as follows.

An open-type container to be useful in this measurement may be of any kind as long as it has a sufficient thermal resistance. For instance, a porcelain crucible may be preferably employed.

About 2 to 5 g of a carbonaceous pitch to be densified is introduced into a cylindrical porcelain crucible (weight: A) weighed in advance and having a size of 10 mm (diameter)× 150 mm (height), and then, the combined weight (B) of the crucible and the carbonaceous pitch is measured. Then, the pitch in the crucible is heated to a temperature of 1000° C. from the room temperature at the rate of 2° C./min. under a pressure ranging from the atmospheric pressure to 10 Kgf/cm$^2$, and then sintered at a temperature of 1000° C. for 2 hours. Subsequently, the resultant product is left to cool down to the room temperature, and then the combined weight (C) of the crucible and the sintered product is measured. Based on these measurements, the value (K) to be obtained by dividing the weight of sintered product of the carbonaceous pitch by the weight of the carbonaceous pitch is calculated as shown below.

$$K=(C-A)/(B-A) \quad (2)$$

Thereafter, the sintered product is taken out of the crucible and cut into a cylindrical shape, the volume (V) of which being subsequently measured. The true density of the sintered product can be measured by using the powder of the sintered product. Specifically, this powder can be prepared by pulverizing the sintered product in a mortar, or by pulverizing, in a mortar, a carbon fiber 3 to 5 mm in length, which has been obtained by melt-spinning a carbonaceous pitch of the same quality as mentioned above and after being infusibilized at a temperature of 200° to 450° C., by sintering the infusibilized product in the same conditions as mentioned above. The powder thus prepared is then charged into a liquid prepared according to the density gradient tube method (immersion liquid: ethyl alcohol/bromoform) as specified in JIS R7601, and after allowing the liquid to take an equilibrium state, the true density (T) of the powder is measured from the density of the liquid of the equilibrium state. The true density (T) of the powder can also be measured by using a graduated pycnometer I-type method as specified in JIS K2249, or by using a Harvard pycnometer method. In this manner, the true density of the sintered product can be determined. Based on these measurements, the value (L) to be obtained by dividing the bulk density of sintered product by the true density of the sintered product is calculated as follows.

$$L=(C-A)/(V\times T) \quad (3)$$

From the results calculated according to the equations (2) and (3), the densification parameter can be calculated as follows.

$$\text{Densification parameter}=K\times L \quad (4)$$

According to the invention, carbon preforms can be densified effectively without using any ultra-high pressure device.

DESCRIPTION OF THE PREFERRED EMBODIMENTS

The invention will now be described with reference to the following Examples and Comparative Examples.

Example 1

(Measurement of densification parameter)

Pitch A having a carbon content of 93.4 wt. %, a hydrogen content of 6.6 wt. % and a carbon/hydrogen atomic ratio= 1.18 and containing no optical anisotropic phase was introduced into a refractory crucible, heated to 1000° C. at a rate of 2° C./min in a furnace which had been pressurized by nitrogen to 9.5 kgf/cm$^2$, and then kept at 1000° C. for 120 minutes to carry out carbonization of the pitch A under pressure, whereby a densification parameter of 0.18 was obtained.

(Preparation of carbon/carbon composite material)

A carbon preform having a void volume fraction of 70% which was prepared by melt spinning an optically anisotropic meso pitch having a softening point of 280° C., making the spun pitch fiber infusible, carbonizing the fiber and then preforming the fiber into a felt, was impregnated with the above-mentioned pitch A under a reduced pressure, heated to 1000° C. at a rate of 2° C./min in a furnace which had been pressurized by nitrogen to 9.5 kgf/cm$^2$, and kept at 1000° C. for 120 minutes to carry out carbonization of the impregnated preform under pressure, whereby was obtained a carbon/carbon composite material having a void volume fraction of 40%.

Comparative Example 1

(Measurement of densification parameter)

Optical anisotropic pitch B having a carbon content of 95.1 wt. %, a hydrogen content of 4.9 wt. % and a carbon/hydrogen atomic ratio=1.62 was introduced into a refractory crucible, heated to 1000° C. at a rate of 2° C./min in a furnace which had been pressurized by nitrogen to 9.5 kgf/cm$^2$, and then kept at 1000° C. for 120 minutes to carry out carbonization of the pitch B, whereby a densification parameter of 0.01 was obtained.

(Preparation of carbon composite material)

A carbon preform having a void volume fraction of 70% was impregnated with the above-mentioned pitch B under a reduced pressure, heated to 1000° C. at a rate of 2° C./min in a firing furnace which had been pressurized by nitrogen to 9.5 kgf/cm², and then kept at 1000° C. for 120 minutes to carry out carbonization of the impregnated preform under pressure, whereby the void volume fraction of the thus obtained preform remained 50%.

Further, in order to increase the densification parameter of pitch B to the same level as that of pitch A, it was necessary to apply a pressure of 100 kgf/cm².

Example 2

(Measurement of densification parameter)

Pitch A having a carbon content of 93.4% by weight, a hydrogen content of 6.6% by weight and a carbon/hydrogen atomic ratio=1.18 and containing no optical anisotropic phase was introduced into a refractory crucible, heated to 1000° C. at a rate of 2° C./min in a furnace which had been pressurized by nitrogen to 9.5 kgf/cm², and then kept at 1000° C. for 120 minutes to carry out carbonization of the pitch A under pressure, whereby a densification parameter of 0.18 was obtained.

(Preparation of carbon/carbon composite material)

A carbon preform which was prepared by plain weaving pitch-derived carbon fibers and then preforming the thus woven carbon fibers using a pitch having a softening point of 280° C. at 700° C. to obtain a carbon preform having a fiber volume fraction of 55%, a matrix volume fraction of 20% and a void volume fraction of 25% was impregnated with the above pitch A, heated to 1000° C. at a rate of 2° C./min in a furnace which had been pressurized by nitrogen to 9.5 kgf/cm², and then kept at 1000° C. for 120 minutes to carry out carbonization of the impregnated preform under pressure, whereby was obtained a carbon/carbon composite material having a void volume fraction of 15%.

Comparative Example 2

(Measurement of densification parameter)

Optical anisotropic pitch B having a carbon content of 95.1 wt. %, a hydrogen content of 4.9 wt. % and a carbon/hydrogen atomic ratio=1.62 was introduced into a refractory crucible, heated to 1000° C. at a rate of 2° C./min in a firing furnace which had been pressurized by nitrogen to 9.5 kgf/cm², and then kept at 1000° C. for 120 minutes to carry out carbonization of the pitch B under pressure, whereby a densification parameter of 0.01 was obtained.

(Preparation of carbon/carbon composite material)

A carbon preform having a void volume fraction of 25% was impregnated with the above-mentioned pitch B, heated to 1000° C. at a rate of 2° C./min in a furnace which had been pressurized by nitrogen to 9.5 kgf/cm², and then kept at 1000° C. for 120 minutes to carry out carbonization of the impregnated preform under pressre, whereby the void volume fraction of the thus obtained preform remained 20%.

Furthermore, in order to increase the densification parameter of pitch B to the same level as that of pitch A, it was necessary to apply a pressure of to 100 kgf/cm².

Example 3

(Measurement of densification parameter)

Pitch C having a carbon content of 95.0 wt. %, a hydrogen content of 5.0 wt. % and a carbon/hydrogen atomic ratio=1.58 and containing no optical anisotropic phase was introduced into a refractory crucible, heated to 1000° C. at a rate of 2° C./min in a firing furnace which had been pressurized by nitrogen to 9.5 kgf/cm², and then kept at 1000° C. for 120 minutes to carry out carbonization of the pitch C under pressure, whereby a densification parameter of 0.12 was obtained.

(Preparation of carbon/carbon composite material)

A carbon preform having a void volume fraction of 25% was impregnated with the above-mentioned pitch C, heated to 1000° C. at a rate of 2° C./min in a firing furnace which had been pressurized by nitrogen to 9.5 kgf/cm², and then kept at 1000° C. for 120 minutes to carry out carbonization of the impregnated preform under pressure, whereby a carbon/carbon composite material having a void volume fraction of 17% was obtained.

Example 4

(Measurement of densification parameter)

Pitch D having a softening point of 280° C., a carbon content of 91.6 wt. %, a hydrogen content of 5.0 wt. % and a carbon/hydrogen atomic ratio=1.47 and containing optical anisotropic phase was introduced into a refractory crucible, heated to 1000° C. at a rate of 2° C./min in a firing furnace which had been substituted with nitrogen and pressurized by nitrogen to 9.5 kgf/cm², and then kept at 1000° C. for 120 minutes to carry out carbonization of the pitch D under pressure, whereby a densification parameter of 0.35 was obtained.

(Preparation of carbon/carbon composite material)

A carbon preform having a void volume fraction of 25% was impregnated with the above-mentioned pitch D, heated to 1000° C. at a rate of 2° C./min in a firing furnace which had been substituted with nitrogen and pressurized by nitrogen to 9.5 kgf/cm², and then kept at 1000° C. for 120 minutes to carry out carbonization of the impregnated preform under pressure, whereby a carbon/carbon composite material having a void volume fraction of 14% was obtained.

What is claimed is:

1. A method of preparing a carbon/carbon composite material which consists of the steps of 1) impregnating a carbon preform with a carbonaceous pitch, said carbonaceous pitch having a carbon/hydrogen atomic ratio of less than 1.60 and exhibiting a densification parameter of 0.1 or more, said densification parameter being calculated by heating said carbonaceous pitch in an open-type crucible from room temperature up to 1000° C. at a rate of 2° C./min. and then keeping at 1000° C. for two hours whereby said carbonaceous pitch is sintered, said densification parameter being calculated by the formula densification parameter=$K \times L$ wherein $$K = \frac{(C-A)}{B-A}$$

and $$L = \frac{(C-A)}{V \times T}$$

wherein

C=weight of the crucible and the sintered product

A=weight of the crucible

B=weight of the crucible and pitch before sintering

V=volume of the sintered product

T=true density of the sintered product and then 2) heating said impregnated preform at a temperature of 250°–3000° C. and subjecting to an isotactic compression at a pressure higher than atmospheric pressure up to 10 Kgf/cm² whereby said impregnated preform is carbonized and a carbon/carbon composite is obtained.

2. The method according to claim 1 wherein the temperature in step 2) is 500°–3000° C.

3. The method according to claim 2 wherein the porosity of said carbon preform is in the range of from 5 to 80%.

4. The method according to claim 2, wherein the densification parameter of said carbonaceous pitch is in the range of from 0.12 to 1.0.

5. The method according to claim 2, wherein the temperature rising rate in step 2) is 0.05°–12000° C./hr.

6. The method according to claim 5, wherein a retention time at the maximum temperature in step 2) is 0.01 minute—10 hour.

7. The method according to claim 2, wherein step 2) is carried out in a nitrogen atmosphere.

8. The method according to claim 2, wherein the measurements of said densification parameter is carried out in a nitrogen atmosphere.

* * * * *